D. K. MILLER.
Seal Locks, &c.

No. 143,831. Patented Oct. 21, 1873.

Witnesses, Harry Smith
Thomas M. Swain

Daniel K. Miller
By his Attys.
Howson and Son

UNITED STATES PATENT OFFICE.

DANIEL K. MILLER, OF PHILADELPHIA, PENNSYLVANIA.

IMPROVEMENT IN SEAL-LOCKS, &c.

Specification forming part of Letters Patent No. 143,831, dated October 21, 1873; application filed July 14, 1873.

*To all whom it may concern:*

Be it known that I, DANIEL K. MILLER, of Philadelphia, Pennsylvania, have invented certain Improvements in Locks, of which the following is a specification:

The main objects of my invention are, to increase the difficulty of picking a lock without unduly complicating the same, and to prevent the destroying or defacing of a seal by mere tampering with the lock.

The general character of the lock is the same as those for which Letters Patent have been already granted to me on the 26th day of July, 1870, and allowed to me on the 10th day of May, 1873, the sliding bolt or hasp B being acted on by a spring, $e$, tending to force it outward, which tendency is resisted by a bell-crank lever or dog, E, adapted to a shoulder, $f$, on the bolt, and there retained by the pressure of its arm $b$ against the edges of a series of tumblers, A, having notches $a$, which, when brought into line opposite the said portion $b$ of the dog by means of a flat key, $h$, permit sufficient movement of the dog to free the bolt or hasp, which then springs outward. (See Figures 5 and 6.)

Figure 2:
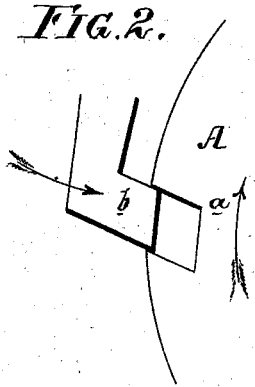
Figure 3:
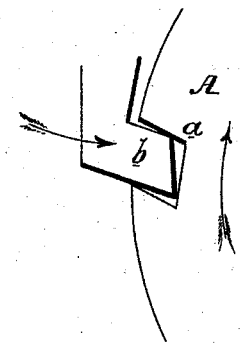
Figure 5:
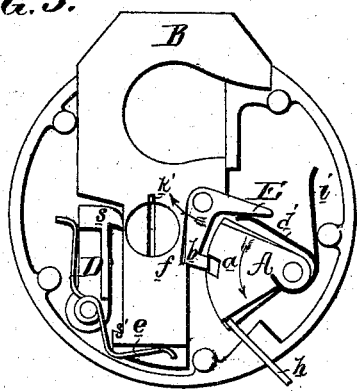
Figure 6:
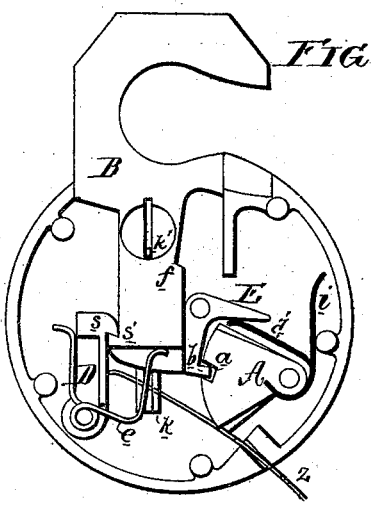

It will be observed that the notches $a$ of the tumblers are inclined, (as best observed in the enlarged views, Figs. 2 and 3,) so that when the notches are first brought opposite the dog the latter will enter the same to a slight extent, as shown in Figs. 2 and 5, but not sufficiently to free the bolt, it being necessary to continue to move the tumblers by means of the key, with the notches still in line, until the dog has gradually entered the same to its full extent, as shown in Figs. 3 and 6, when the said dog will have passed the shoulder $f$ of the bolt, and the latter will be free to shoot outward.

Figure 1:
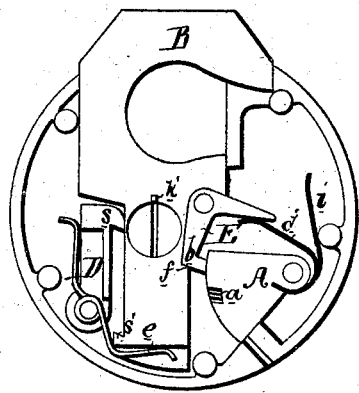

When the bolt has been pushed inward in order to lock the same, and its recess and shoulder $f$ brought opposite the dog, the springs $i$ of the tumblers, tending to turn the latter in the direction of the arrow, Fig. 5, and being, in the aggregate, of greater strength than the spring $j$ of the dog, will cause the inclined edges of the notches $a$ in the tumblers to act upon and automatically eject the dog from the said notches, turning the same in the direction of the arrow, Fig. 5, until it has fully entered the recess above the shoulder $f$ of the bolt and freed the tumblers, which then spring to the position shown in Fig. 1. Tumblers having springs and inclined notches $a$ for the purposes above described may be combined directly with a bolt or hasp, as well as with a dog and bolt.

It will be observed that upon the face of the bolt B there is a circular recess for the reception of a seal, $x$, and directly over this recess an opening, $y$, in the lock-casing, covered by a glass plate, through which the seal can be seen.

My object is to so arrange the seal that it shall be positively defaced or destroyed if the lock is opened, but so that it cannot be injured maliciously, or by merely tampering with the tumblers or other moving parts in attempting to pick the lock. I have found that the most certain way of effecting this object is to attach both the seal and the defacing device to the sliding bolt, so that both shall move with the same.

Figure 4:
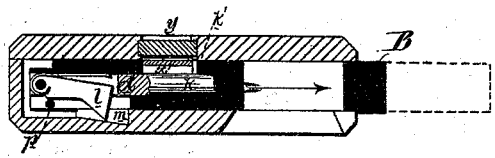

Various devices may be used for defacing or destroying the seal. In Fig. 4 a sliding rod, $k$, is adapted to a recess in the bolt, and has a spring-dog, $l$, hung to it, which, when the bolt is shot forward in the direction of the arrow, strikes a shoulder, $m$, on the lock-casing, and thus holds the rod $k$ and causes a projection, $k'$, of the same to traverse a slot, $n$, in the bolt, and to tear or deface the seal immediately over the said slot. On the reverse movement of the bolt the parts are restored to their original positions by the striking of the end of the rod $k$ against the lock-case, and by a pin, $p$, of the bolt, which lifts the dog $l$, as shown.

Instead of the above, a lever so hung to the bolt that when one arm strikes a shoulder on the casing the other will be dragged through the seal, would answer the purpose well.

Any form of seal may be employed; but I intend in most instances to use an embossed or corrugated paper or metal seal, for which I propose to make a separate application for a patent.

It is often desirable to remove the bolt from and replace it in the lock-casing without detaching the cap-plate from the casing, this being especially the case in locks of the character illustrated, in which the cap-plate is riveted fast. A retainer, D, is hung to a projection, $q$, of the lock-case, and is so acted on by a portion of the same spring, $e$, which actuates the bolt as to be maintained in constant contact with the side of the latter. A hooked projection, s, of the retainer catches a corresponding projection, s', of the bolt, and thus determines the extent of the outward movement of the latter, as shown in Fig. 6; but by simply inserting a rod, z, through the key-hole, as shown in Fig. 6, and forcing the same against the retainer, the latter may be pressed back from the bolt, which will then spring entirely out of the lock-case. The retainer has a beveled upper edge, so that it will yield and offer no obstruction to the reintroduction of the bolt into the case.

The shoulders s and s' may be straight, or inclined in the opposite direction, if desired, so as to enable the bolt to be pulled out of the casing by a slight effort, without necessitating the use of an instrument to be inserted through the key-hole.

I claim as my invention—

1. A lock having spring-tumblers with notches inclined in respect to the direction of the movement of the portion of the dog or bolt adapted to the same, and serving as automatic ejectors for the said dog or bolt in locking, all substantially as described.

2. A seal-lock in which the seal and the device for destroying or defacing the same are attached to and move with the bolt or hasp, substantially as herein described.

In testimony whereof I have signed my name to this specification in the presence of two subscribing witnesses.

D. K. MILLER.

Witnesses:
WM. A. STEEL,
HARRY SMITH.